United States Patent [19]

Conn et al.

[11] 4,442,933

[45] Apr. 17, 1984

[54] CENTRIFUGAL SWITCH FOR CONTROLLING BELT HAULING SYSTEMS

[76] Inventors: George E. Conn, c/o George Spector, 3615 Woolworth Bldg., 233 Broadway, both of New York; George Spector, 3615 Woodworth Bldg., 233 Broadway, both of N.Y. 10007

[21] Appl. No.: 870,220

[22] Filed: Jan. 17, 1978

[51] Int. Cl.³ ...................... B65G 43/00; H01H 35/02
[52] U.S. Cl. .................................... 198/502; 198/856; 226/45
[58] Field of Search ............... 198/502, 503, 824, 827, 198/505, 854, 855, 857, 862; 226/45, 100; 200/61.13; 74/12; 73/2, 493; 299/1

[56] References Cited

U.S. PATENT DOCUMENTS

| 3,219,174 | 11/1965 | Eckhardt et al. | 198/828 |
| 3,431,738 | 3/1969 | Groetschel | 198/862 X |
| 3,668,794 | 6/1972 | Marquardt et al. | 198/854 X |
| 4,088,222 | 5/1978 | Hurt | 198/502 |

FOREIGN PATENT DOCUMENTS 920742  3/1963  United Kingdom ................ 198/855

*Primary Examiner*—Stephen C. Kunin
*Assistant Examiner*—Douglas D. Watts

[57] ABSTRACT

A centrifugal switch assembly protected from moisture and dust mounted adjustably beneath the top run of a conveyor belt adapted to be driven by the top run and secured to cable supports provided along side the opposite edges of the belt so that the switch assembly is completely beneath the top run for operating and protective purposes.

2 Claims, 5 Drawing Figures

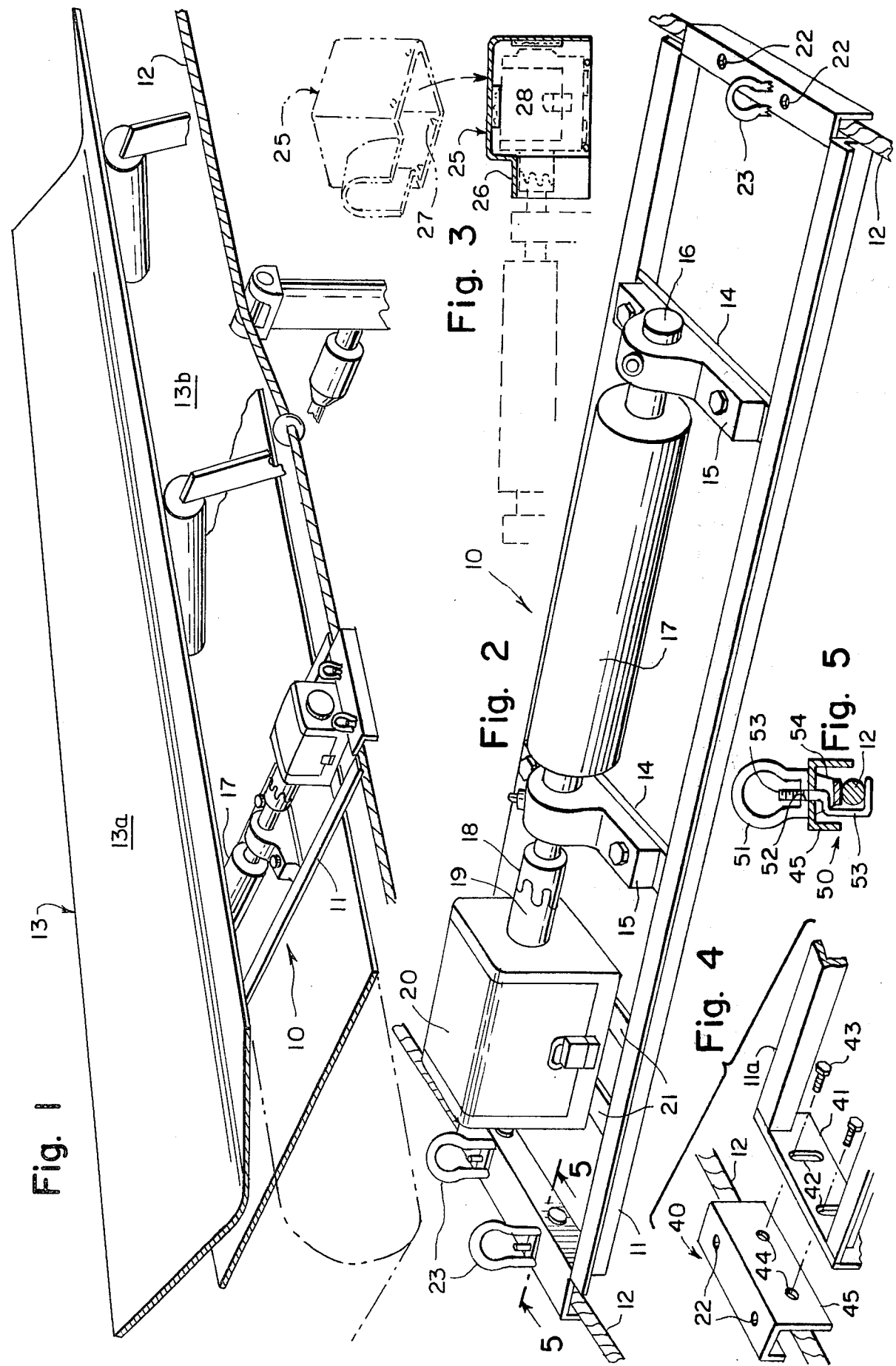

CENTRIFUGAL SWITCH FOR CONTROLLING BELT HAULING SYSTEMS

This invention relates generally to mining equipment. More specifically it relates to belt hauling system switches.

It is well known to those in the field of coal mining, that underground belt hauling systems heretofore have been subject to relatively frequent stoppages which runs as high as 18 percent. This is due mostly to the excessive amounts of water that is used for controlling coal dust on belt lines and belt heads. This causes a great deal of fine wet coal dust to collect on switches and results in the stoppage of the belt. This situation is of course objectionable and is therefore in want of an improvement.

Accordingly, it is a principal object of the present invention to provide a centrifugal switch within a covered housing that is positioned underneath the top belt and is therefore protected so that no wet coal dust refuse can collect on the switch.

Another object is to provide a centrifugal switch that reduces belt stoppage to a minimum, wherein the switch is enclosed and mounted on a frame which is vertically adjustable.

Other objects are to provide a centrifugal switch which is simple in design, inexpensive to manufacture, rugged in construction, easy to use, efficient in operation.

These and other objects will be readily evident upon a study of the following specifications and the accompanying drawing wherein:

FIG. 1 is a perspective view showing the invention installed for operative use.

FIG. 2 is an enlarge perspective view of the invention.

FIG. 3 is an elevation showing various internal details.

FIG. 4 is a fragmentary perspective view of a modified design of the frame of the invention, and which allows vertical adjustability of a pressure roller against an underside of the conveyor belt.

FIG. 5 is an enlarged cross sectional view on line 5—5 of FIG. 2 and illustrating one possible means of stationarily securing the frame to the rope.

Refering now to the drawing in greater detail, and more particularly to FIG. 1 and 2 thereof at this time, the reference numeral 10 represents an assembly according to the present invention which includes a stationary frame 11 of rectangular shape fixedly supported at its opposite ends on ⅜ inch wire cables 12.

An endless belt 13 as used for hauling coal in a mine. The frame 11 is made of 3/16 by 1½ inch angle irons. A pair of transverse metal cross plates 14, secured to the frame, have pillow blocks 15 bolted thereupon so to support bearings for a rotatable shaft 16. A roller 17 is positioned to bear against an underside of a top run 13a of the endless coal conveyor belt; the longitudinal center of the roller axis being aligned with the transverse center of the belt.

One end of the shaft is connected by means of a coupling 18 to a shaft 19 of a conventional centrifugal switch 20 enclosed in a a housing and bolted upon metal crossplates 21 secured to the frame, so that the switch is operated by rotation of the roller 17. It is to be noted that switch 20 is enclosed and protected from coal dust or other contaminants.

A pair of holes 22 are drilled through each opposite end of the frame so to be fitted with a pair of rope locks 23 in order to stationarily secure the frame 11 on the wire cables 12.

The bottom run 13b of the belt 13 moves on spaced relation below the frame 11.

In operative use, it is now evident that as the roller is driven by the belt, the centrifugal switch is rotated accordingly and will not malfunction because of its sheltered upper position and its enclosure in said housing.

In FIG. 3, a modified design of the invention is shown to additionally include an extra cover 25 made of inexpensive formed plastic so to snap fit over the top of the centrifugal switch; the cover extending downwardly so to fully enclose the switch from above, and thus prevent any coal dust to settle down directly upon the switch. The cover includes, integral therewith, a sleeve 26 that extends over the coupling to also keep dust thereoff. Inward bulges 27 along a lower edge of the switch are provided for rigid securement against the switch housing. The cover thus also encloses the sidewall opening through with the switch shaft 19 enters the switch case, so to prevent coal dust to enter therein. A magnet 28 on the bottom of the cover also serves to retain on the switch.

The present invention is not held to any specific dimensions and may be made up in any sizes. For existing mine equipment it should be 48 inches long for a 36 inches wide belt (or 54 inches long for a 44 inches wide belt). The roller is 16 inches long.

In FIG. 4, a modified design of the frame construction 40 includes a frame 11a which at its opposite ends has an end wall plate 41 forming a rigid component of the frame, and each end plate has a pair of vertical slots 42 for adjustably receiving a screw 43 secured in threaded opening 44 of a channel 45 positioned against the outer side of the plate 41, so that the frame is vertically adjustable respective to the two channels. The channels are supported upon the cables 12 and are securable thereto by the rope locks 23, described above, and which are mounted in openings 46 formed on the cahnnels. Thus the roller can be vertically adjusted to properly contact the belt.

In FIG. 5, a design of rope locks 50 is shown for securing the frame rigidly to the cables. This includes rope locks ring 51 having threaded openings 52 engaging threaded end of a hook 53 that bears against an underside of the cable 12 and locks it against a U-shaped spacer 54 positioned between an underside of the frame end channel or channel member 45 and the upper side of the cable.

While various changes may be made in the detail construction, it is understood that such changes will be within the spirit and scope of the present invention as in defined by the appended claims.

What is claimed is:

1. A centrifugal switch assembly controlling a coal belt hauling system, comprising in combination an endless belt, and an assembly including a conventional centrifugal control switch positioned underneath and in operative engagement with the top run of said belt wherein said switch is enclosed in a housing, including means for adjusting the vertical position of the assembly relative to said belt, wherein said assembly additionally comprises a frame having said centrifugal switch mounted upon one end thereof including a roller at the center of said frame which bears against an underside of said belt top run, said roller being secured on a shaft supported rotatably free in bearings of pillows mounted on said frame, one end of said shaft being connected by means of a coupling to a switch shaft and said frame being supported at its opposite ends upon a pair of wire cables positioned parallel to and along each opposite edge of said belt, said cables extending through parallel inverted channels forming opposite ends of said frame, and being secured to said channels by rope locks mounted on said channels, including a cover, removably snap fitted over said centrifugal switch protectively enclosing the same, wherein said cover includes a sleeve intergal therewith extending over said coupling.

2. The combination as set forth in claim 1, wherein the first said means comprises said channels at said opposite ends of said frame being vertically adjustable respective to said frame, wherein said rope locks each includes a manually rotatable ring mounted on each channel having a threaded opening engaging a threaded shank of a hook placed against an underside of said cable and extending through a hole in each channel and a U-shaped spacer being located between an upper side of said cable and an underside of said channel.

* * * * *